United States Patent
Francia

[11] 3,713,364
[45] Jan. 30, 1973

[54] FLUID CONTROL DEVICE
[75] Inventor: Giovanni Francia, Genova, Italy
[73] Assignee: L. I. R.-S.p.A.-Laboratorio Italiano, Ricerche, Genova, Italy
[22] Filed: May 13, 1970
[21] Appl. No.: 36,837

[30] Foreign Application Priority Data
May 14, 1969  Italy..................................4584 A/69

[52] U.S. Cl. .....................92/13.1, 92/13.4, 92/13.6, 92/65, 91/167
[51] Int. Cl. ...........................F15b 11/18, F01b 7/10
[58] Field of Search ..........91/167; 92/13.4, 13.6, 65, 92/13.1; 235/201 ME, 200 R

[56] References Cited
UNITED STATES PATENTS

| | | | |
|---|---|---|---|
| 3,057,205 | 10/1962 | Howard et al. | 91/167 |
| 3,153,522 | 10/1964 | Pizer et al. | 91/167 |

*Primary Examiner*—Paul E. Maslousky
*Attorney*—Waters, Roditi, Schwartz & Nissen

[57] ABSTRACT

A device for the movement of a mechanical member into a plurality of positions along a rectilinear trajectory. A hollow cylinder has a plurality of outer stops spaced in its own inner walls, and an axial element is axially movable in said cylinder to actuate the mechanical member. The axial element is provided with an enlarged piston sealing the cylinder and a plurality of axial inner stops spaced along its axial stem. Fluid passages in the hollow cylinder are controlled to feed fluid into and discharge fluid from the cylinder. At least one satellite piston is slidable in the cylinder and is movable between two outer stops of the cylinder and between two inner stops on a stem portion of the axial element. The fluid feed and the discharge are effected according to a series of combinations in a binary code and there is obtained consequent movements of the satellite piston and the axial element in cooperation with the stops, to define respective stopping positions of the axial element.

10 Claims, 26 Drawing Figures

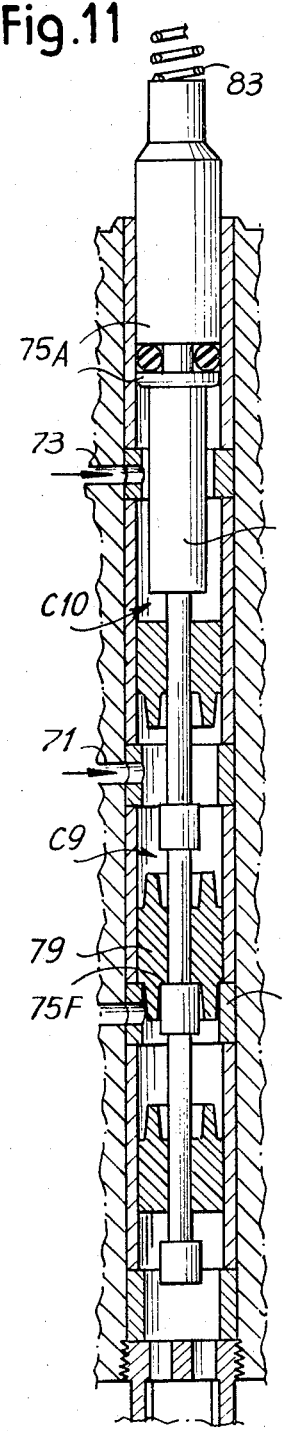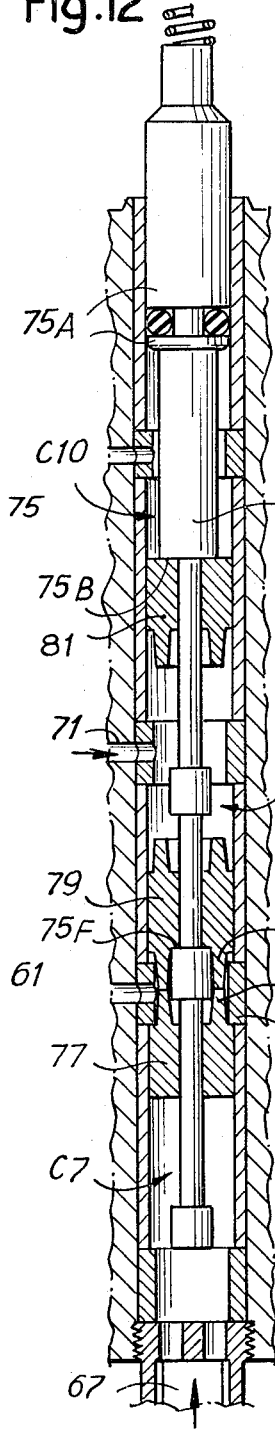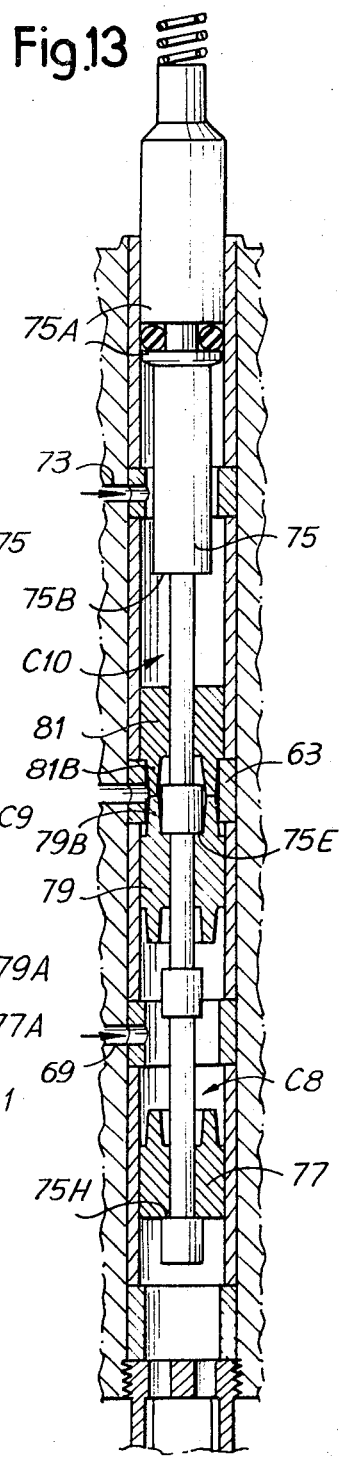

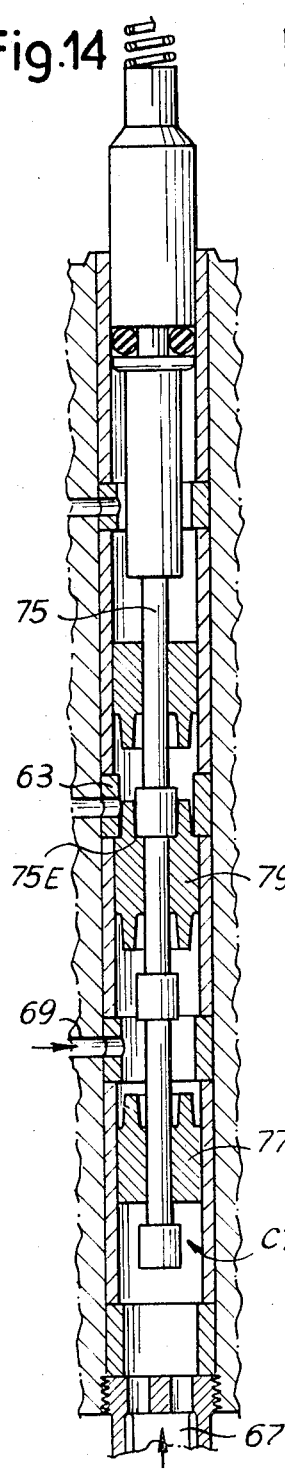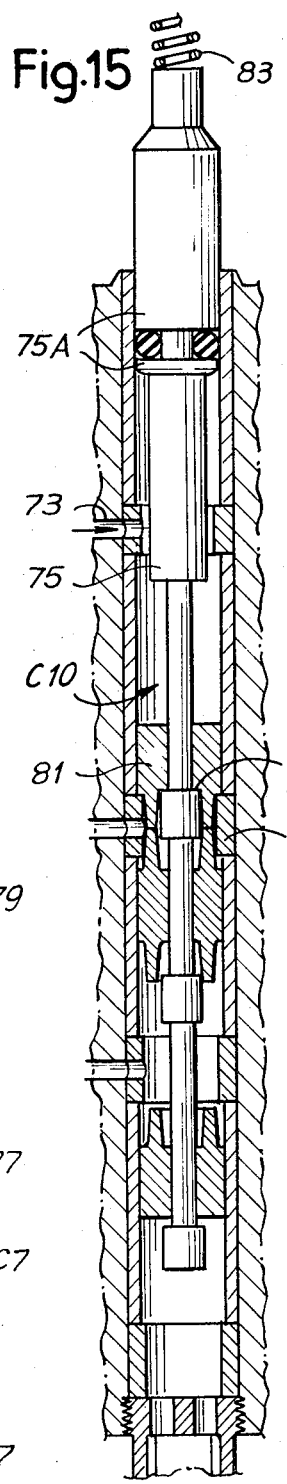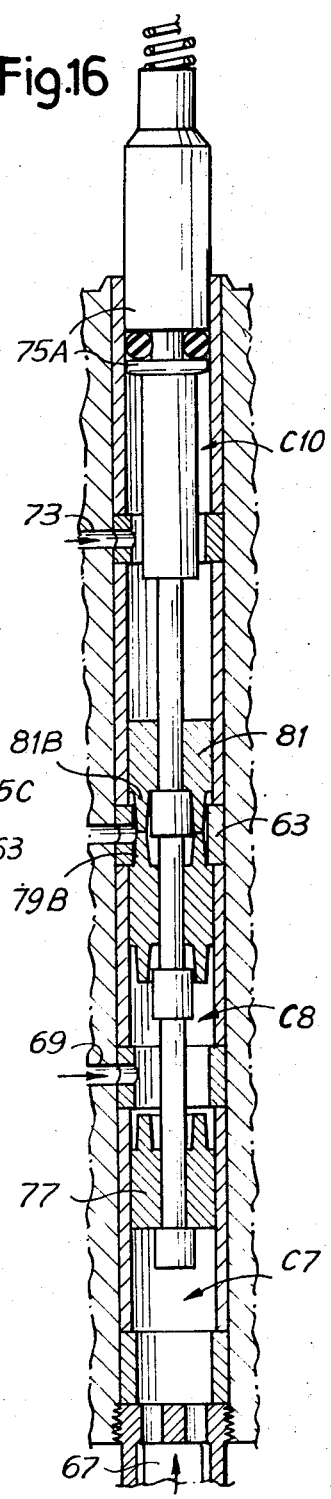

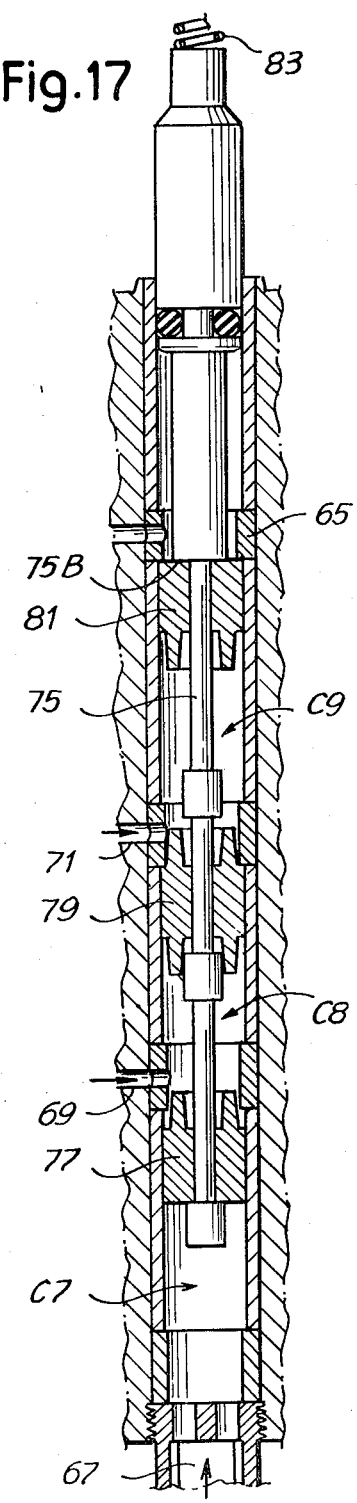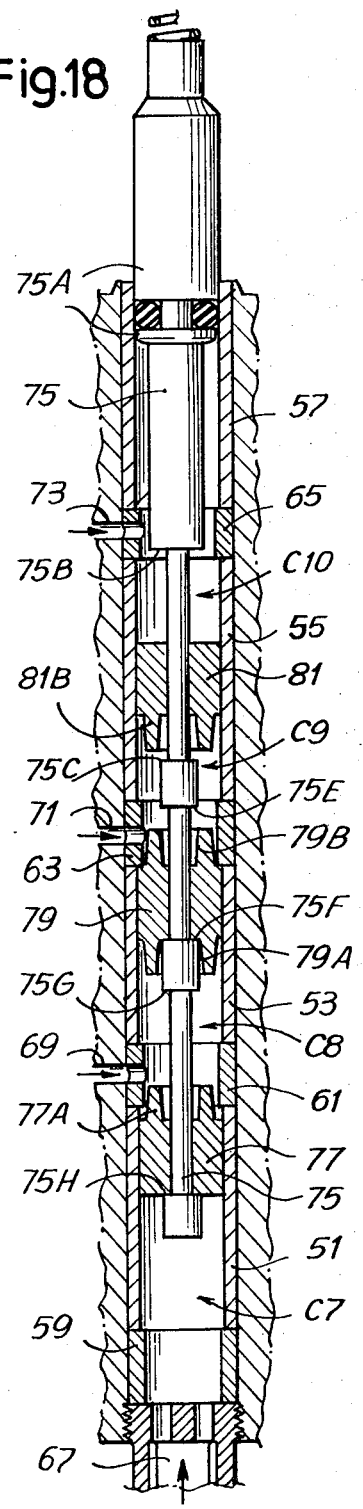

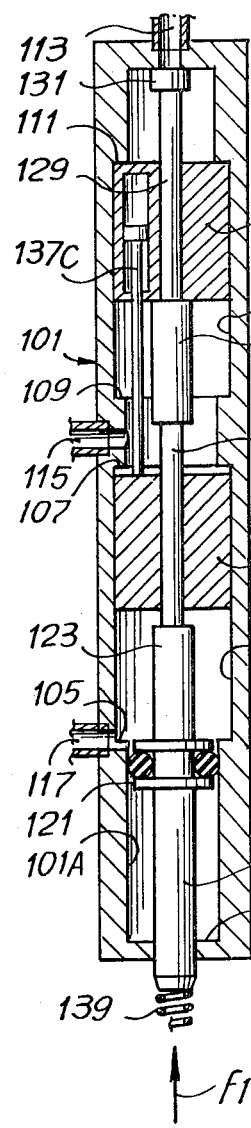
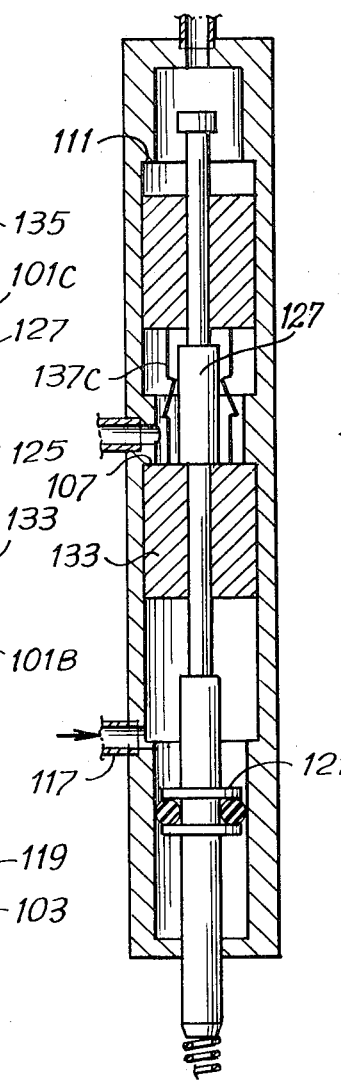
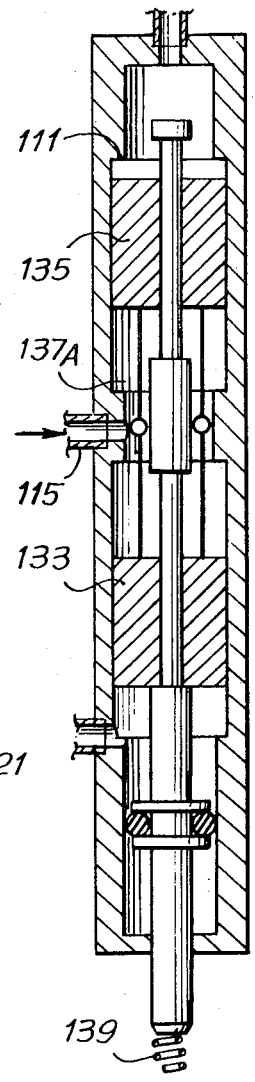

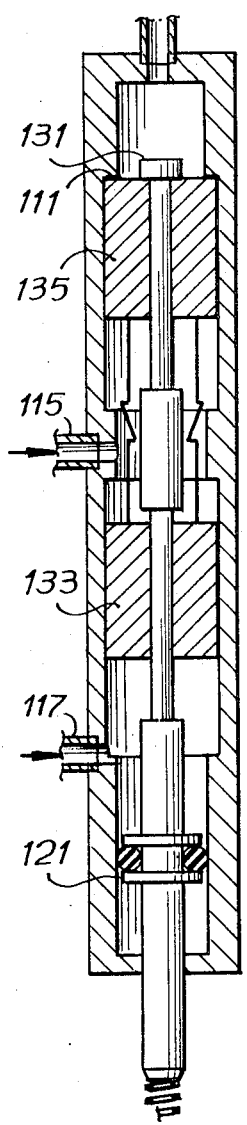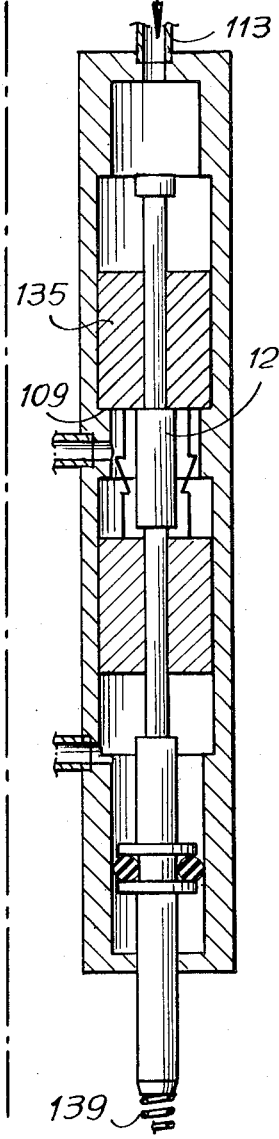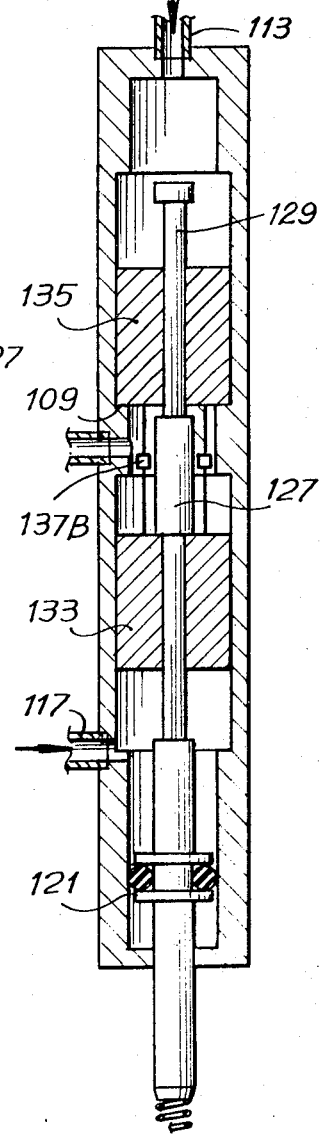

FLUID CONTROL DEVICE

An object of this invention is to provide a fluid device, preferably hydraulic for the movement of a mechanical member into a plurality of positions along a rectilinear trajectory. The device can be a hydraulic transducer of oil-dynamic type and substantially an actuator having many applications. Among the latter are controls for automatic machine tools, controls for jacks and needle selection cams in hosiery circular machines, servo-drives for reverse gears in cars and the like.

According to the invention, the device includes: a hollow cylinder structure, an axial element movable therein, a plurality of feeds to the hollow cylinder and at least one satellite piston. The hollow cylinder structure is provided with a plurality of outer stops spaced in its own outer walls. The axial element is axially movable in said cylinder to actuate said mechanical member and is provided with an enlarged piston or piston expansion forming a seal with said cylinder, one of the stops defining the inner end position of the axial element and thus of the mechanical member. A plurality of inner axial stops are spaced along the stem of the axial element. A plurality of fluid feed means are connected to said hollow cylinder, each single feed being controlled by valve means for the feed and discharge. A smaller number of drilled satellite pistons are slidable in said cylinder and each is movable in the gap between the outer stops and between two inner stops of the stem on which it is slidably inserted. The arrangement is such whereby, with a feed according to a series of binary code combinations of said feed means, it is possible to obtain consequent movements of each satellite piston and of the axial element and by the cooperation thereof in opposite directions with the stops, to define different stopping positions of the axial element.

In practice, the satellite pistons are $(n - 1)$ in number ($n$) being the number of the fluid feed means to the cylinder; each satellite piston is designed to cooperate in opposite directions with two contiguous outer stops of the cylinder and with two contiguous inner stops of the axial element stem; moreover, each feed is actuated in the chambers defined between contiguous satellite pistons, between the most external thereof and the piston expansion on the stem, and between the most internal thereof and the cylinder bottom, and thus, in practice, in correspondence with the outer stops in the cylinder.

In order to stabilize some positions which cannot be obtained only by the pressure of the oil, there is provided a spring which axially acts on the axial element, to urge it inwardly; said spring has a particular strength in relation to the forces obtained with the operating pressure of the fluid on the active movable surfaces of the piston expansion and of the satellite pistons.

In a fluid device including at least two satellite pistons, at least a first of said satellite pistons has an axial extension, designed to form a stop cooperating with a second contiguous satellite piston, to establish therewith a stopping position of said second satellite piston, in an intermediate arrangement between the contiguous external stops of the cylinder, between which said second satellite piston may move; the difference of the axial forces acting in opposite directions on the assembly of the two considered satellite pistons, assures the engagement of said first satellite piston against the outer stop of the cylinder restricting its stroke towards the second satellite piston.

In one embodiment, contiguous satellite pistons are coupled with each other by tie rod means, in such a manner whereby one satellite piston assumes an intermediate position between its outer stops, when the other satellite piston is in one of its stop positions, and the chamber between said two satellite pistons is fed by pressure fluid.

The cylinder may be made with a constant diameter in all the lengths — defined between contiguous stops — along which the satellite pistons slide; the length of the cylinder along which the piston expansion of the axial element slides, may be also of the same diameter as the other lengths or may have a smaller diameter. In the latter case, the transverse dimension of the piston expansion may be smaller than that of the satellite pistons by such an amount whereby there is a difference between the active areas thereof equal substantially equal to one-half of the area of the bores in the satellite pistons, wherein the axial stem is inserted.

The device may include means — such as profiles cooperating between the cylinder walls and those of the satellite pistons and of the piston expansion — to dampen the impact between the relatively movable members at the arrival against a stop.

The invention will be explained with the aid of the following specification and accompanying drawings, with reference to specific embodiments which are given as examples but not restricting the invention. In the drawings:

FIGS. 8 to 18 illustrate the 11 positions of an actuator including three satellite pistons and four feeds;

FIGS. 19 to 26 illustrate an actuator having eight independent positions under the conditions corresponding to said positions, the satellite pistons being bound by rafter and tie rod means.

Figure 1:
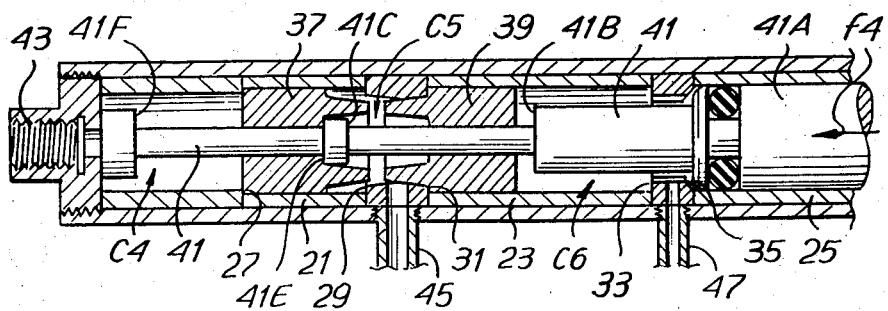
FIGS. 1 to 7 illustrate the seven positions which an actuator device including two satellite pistons and three feeds may assume.

In FIGS. 1 to 7 there are provided three cylindrical lengths 21, 23 and 25, limited respectively: the length 21 by outer stops 27 and 29; the length 23 by outer stops 31 and 33 and the length 25 in a single direction by an outer stop 35. In the length 21 a satellite piston 37 travels; in the length 23 a satellite piston 39. By 41 is denoted the inner movable axial element, which is provided with an enlarged piston or piston expansion 41A acting in the cylindrical length 25; two opposite stops 41B and 41C between which the satellite piston 39 acts and two opposite stops 41E and 41F between which the satellite piston 37 acts. A spring (not shown in FIGS. 1–7) acts in the direction of the arrow $f4$; numerals 43, 45, 47 denote three fluid feeds (e.g., oil), forming the same number of oil-dynamic or hydraulic controls, to feed cavities C4, C5 and C6.

By symbols of the binary code and the symbolism according to which "0" denotes the discharge condition and "1" the feed condition, the apparatus of FIGS. 1 to 7 may be respectively indicated with the following format, where the three numbers indicate subsequently the feeds 43, 45 and 47:

| | | |
|---|---|---|
| 0 | 0 | 0 |
| 1 | 0 | 0 |
| 0 | 0 | 1 |

```
 1   0   1
 0   1   1
 1   1   0
 1   1   1
```

In the arrangement of FIG. 1 the only action is that due to the spring which acts in the direction of the arrow f4, keeping in a stop position the end of the stem 41 against the left hand bottom of the cavity C4.

Figure 2:
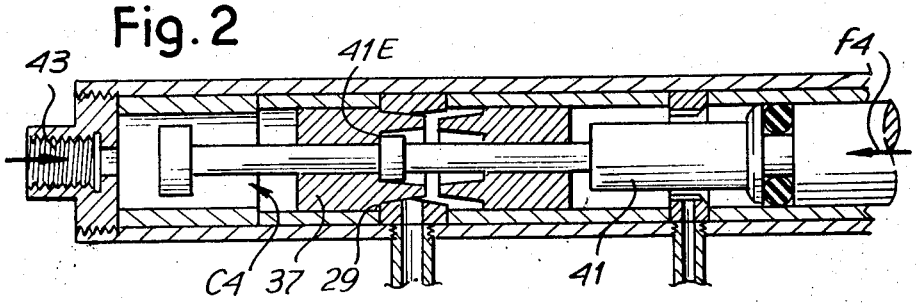

In the arrangement of FIG. 2 only feed 43 is active, which acts to urge the satellite piston 37 against the stop 29; the spring determines the resting of the inner stop 41E against the satellite 37.

Figure 3:
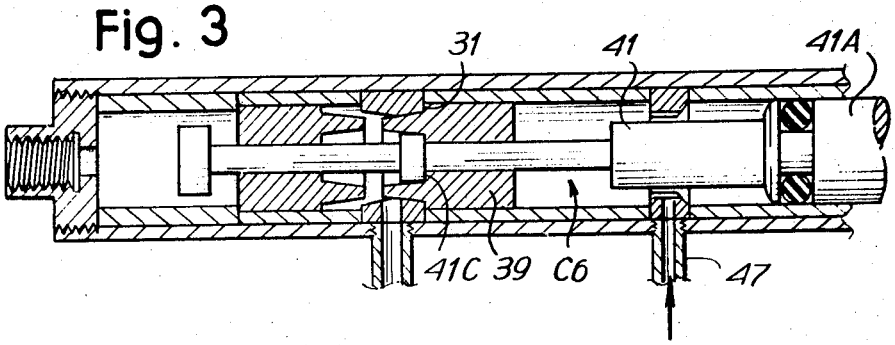

In the arrangement of FIG. 3, only feed 47 is active, which feeds the chamber C6 and urges the satellite piston 39 against the stop 31, while the combined action of the fluid pressure on the piston expansion 41A and of the spring, imposes a rest of the inner stop 41C against the satellite piston 39 with a thrust smaller than that which the piston receives in the reverse direction to rest on the outer stop 31.

Figure 4:
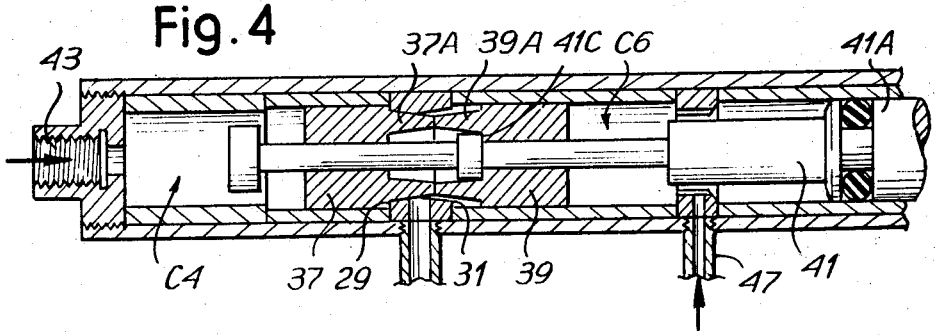

In the arrangement of FIG. 4 the feed is effected at 43 and 47. In this arrangement, there is obtained a movement, — with respect to the position of FIG. 3 —, of the satellite piston 37 until it rests against the outer stop 29; under these conditions, an extension 37A of the satellite piston 37 contacts a corresponding opposite extension 39A of the piston 39, whereby the latter is moved away from the stop 31 owing to the greater thrust exerted by the piston 37 with respect to the resultant of the forces acting on the piston 39; in this way there is obtained an additional advance towards the right (looking at the drawing) of the inner movable element 41 by an extent corresponding to the distance appearing in FIG. 4 between the stop 31 and the piston 39.

Figure 5:
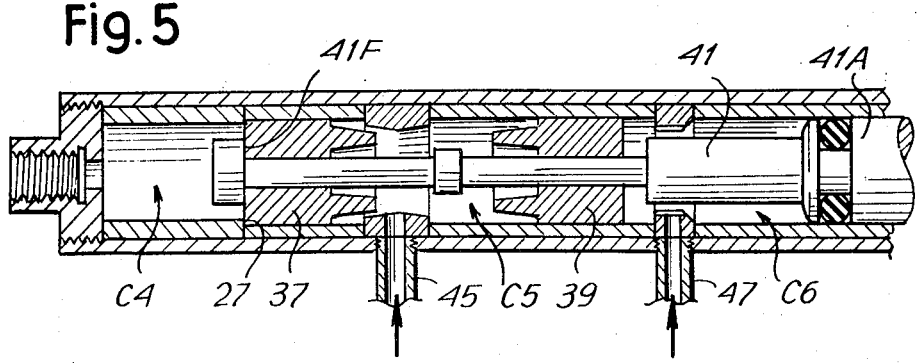

In the arrangement of FIG. 5, the cavity C4 is under discharge conditions, while the cavities C5 and C6 are fed at 45 and 47. In this arrangement, the satellite piston 37 is urged against the stop 27, the piston 39 is in neutral equilibrium condition and the piston expansion 41A is urged towards the right. The inner stop 41F is abutted against the satellite piston 37 by the effect of the differential thrust between that on the piston expansion 41A and that of the spring acting in the direction of the arrow f4.

Figure 6:
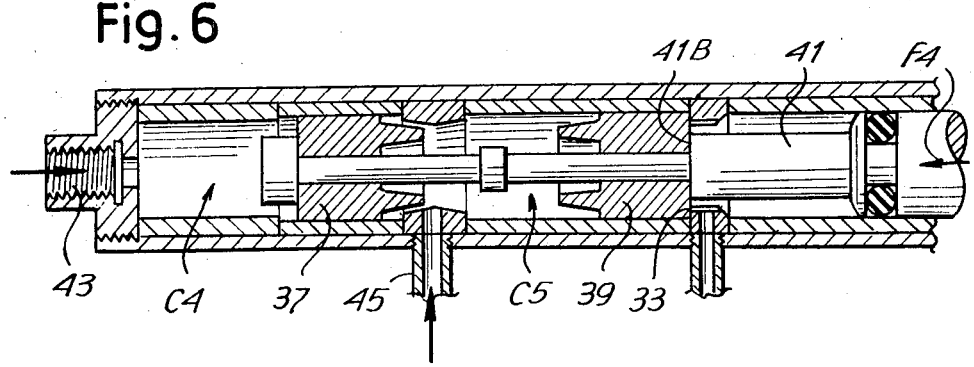

In the arrangement of FIG. 6 the feeds 43 and 45 pressurize the cavities C4 and C5; the satellite piston 37 is in neutral equilibrium, while the satellite piston 39 is urged against the stop 33; the action of the spring in the direction of the arrow f4 makes the stop 41B of element 41 abut against the piston 39.

Figure 7:
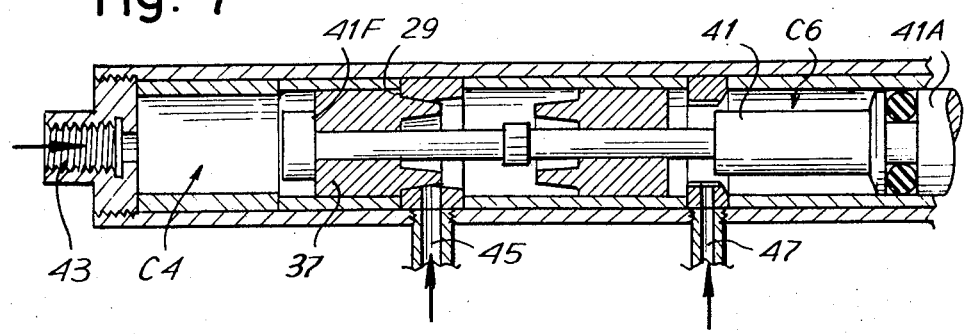

In the arrangement of FIG. 7, the three oil-dynamic controls 43, 45, 47 feed the three cavities C4, C5 and C6. The piston 37 is urged against the stop 29 by the effect of the differential thrust exerted thereon by the inner stop 41F, said differential thrust being determined by the difference between the effect of the spring and the thrusts of the fluid of the cavity C4 on the stem end and of the fluid of the cavity C6 on the piston expansion 41A.

The profile of the extensions 37A and 39A — in cooperation with the profile developed between the stops 29 and 31 — assures a gradual dampening of the approach movement of the respective piston towards said two stops. Similar arrangement may be provided for dampening the movement towards other stops.

In FIGS. 8 to 18 there is shown an actuator in a series of its possible configuration.

In a suitable housing structure there are assembled cylindrical sheaths 51, 53, 55 and 57 interposed between collars 59, 61, 63, 65, the sheath 57 being outer most.

Numerals 67, 69, 71, 73 denote feeds for oil controls or drives in correspondence with the collars 59, 61, 63, 65. A movable element 75 axially slides in the housing defined in the aforesaid manner. Along the sheath 51 a satellite piston 77 slides and may contact stop formed by the collars 59 and 61. A satellite piston 79 is slidable along the sheath 53 and piston 79 may contact as a stop the collars 61 and 63. A satellite piston 81 slides along the sheath 55 and may contact as a stop the collars 63 and 65. The sheath 57 cooperates with a piston-expansion 75A, formed by the movable element 75 and provided with a seal ring. The satellite piston 81 is slidable between the stops 75B and 75C of the element 75. The satellite piston 79 is slidable between the stops 75E and 75F of the element 75. The satellite piston 77 is slidable between the stops 75G and 75H of the element 75.

Figure 8:
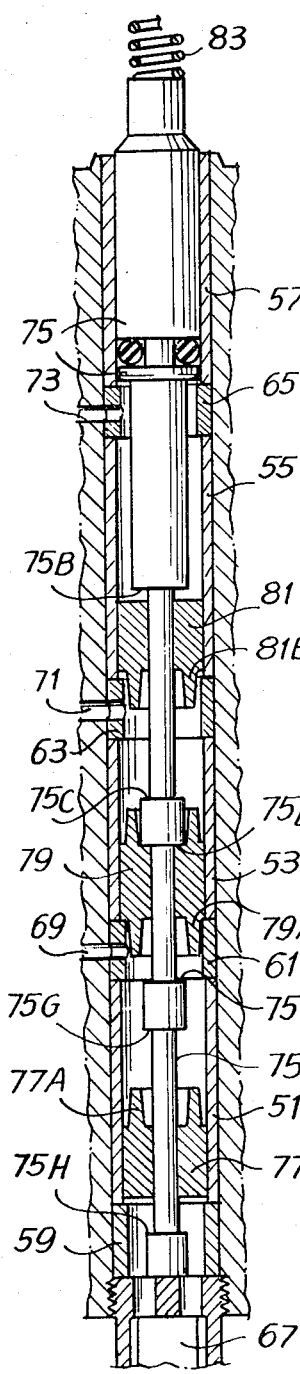

In the configuration of FIG. 8 the movable element 75 is stressed exclusively by a spring 83, which makes the lower end in FIG. 8 abut against the bottom of the cavity C7, defined additionally by the satellite piston 77. The satellite pistons moreover define cavities C8, C9 and C10, the latter being additionally defined by the piston expansion 75A of the element 75. All these cavities in the arrangement of FIG. 8 are connected for discharge to the respective feed conduits 69, 71, 73, the cavity C7 being in discharge via the feed conduit 67. This position corresponds to the combination 0 . 0 . 0 . 0 . in the binary code, having four digits.

Figure 9:
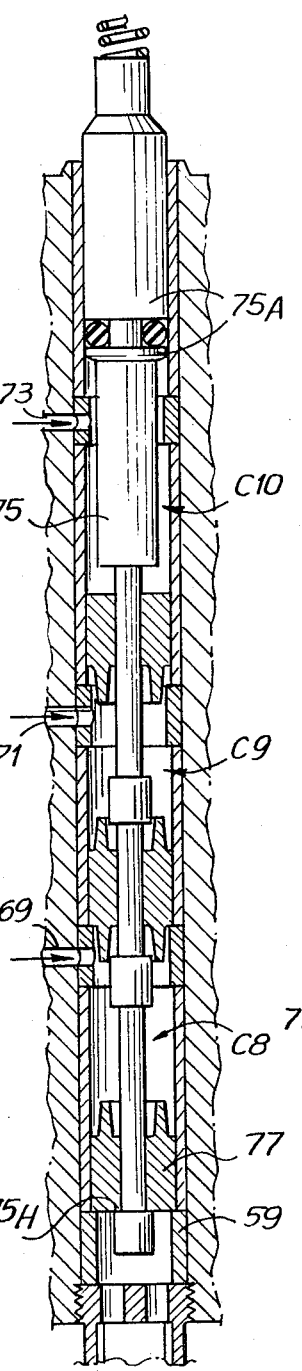

In the arrangement of FIG. 9 and following, the feeds are established in one or more than one of the feeds 67, 69, 71, 73 with an arrangement in binary code with the previously stated symbolism and in the succession hereinafter indicated of the feeds.

In FIG. 9 the pressurized fluid feed is established according to the conditions 0 . 1 . 1 . 1 . Thus the cavities C8, C9, C10 are fed. The satellite piston 77 is urged against the collar 59, the stop 75H of the movable element 75 is urged against the satellite piston 77, with a thrust equal to the difference between that exerted by the fluid pressure on the piston expansion 75A and the force of the spring 83 which is about equal to one-half thereof, increased by half of the force which the pressure exerts on the stem. The movement from the position will call for a force substantially equal to that of the spring.

Figure 10:
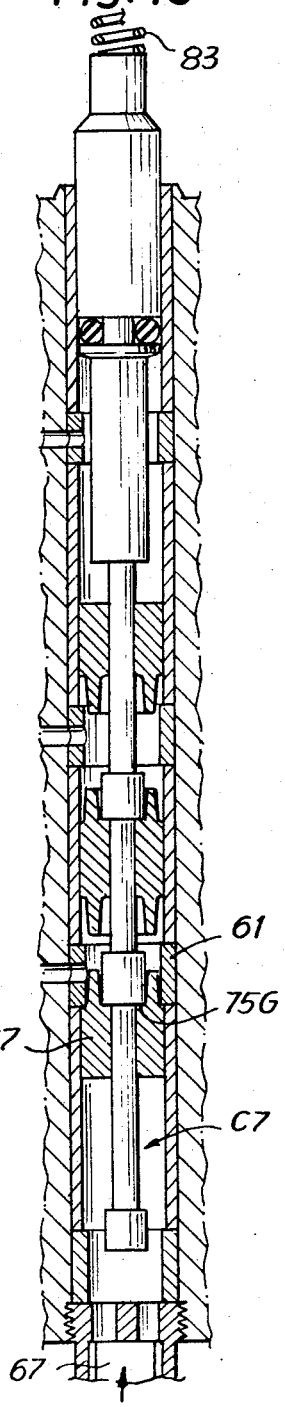

In the arrangement of FIG. 10, the feed is established according to the conditions 1 . 0 . 0 . 0 . and thus the only chamber C7 is fed to cause the satellite piston 77 to be urged against the collar 61; the spring 83 acts on the element 75 to urge the stop 75G against the satellite piston 77.

In the arrangement of FIG. 11 the feed is established according to the conditions 0 . 0 . 1 . 1 . and the chambers C9 and C10 are thus fed; the satellite piston 79 is brought against the collar 61 and the stop 75F of movable element 75 is brought against the satellite piston 79, by the differential thrust between that exerted on the piston expansion 75A and that of the spring 83.

In the arrangement of FIG. 12 the feed is established according to the conditions 1 . 0 . 1 . 0 . and thus the chambers C7 and C9 are fed. The piston 77 is urged against the collar 61; the satellite piston 79 is urged by the pressure fluid against the satellite piston 77, through the two extensions 79A and 77A; the piston 81 is urged against the stop 75B and the movable element 75 is thus stressed with its own stop 75F to rest against the satellite piston 79. The same effect is obtained if also the chamber C10 (combination 1 . 0 . 1 . 1 .) is fed, and in this case the element 75 is stressed by the thrust of the liquid on the piston expansion 75A, while the satellite piston 81 remains free between two equal pressures.

In the arrangement of FIG. 13, the feed is established according to the conditions 0 . 1 . 0 . 1 . and thus the chambers C8 and C10 are fed. The satellite piston 81 is urged against the collar 63. The satellite piston 79 is urged to rest against the satellite piston 81 by means of the extensions 79B and 81B, respectively. The stop 75E on the movable element 75 is urged against the piston 79 by the resultant of the forces on element 75.

In the arrangement of FIG. 14, the feed is established according to the conditions 1 . 1 . 0 . 0 . and thus the chambers C7 and C8 are fed. The satellite piston 77 is in neutral equilibrium, while the satellite piston 79 is urged against the collar 63. By effect of the thrust of the spring 83, the stop 75E on element 75 is brought to rest against the satellite piston 79.

In the arrangement of FIG. 15, the feed is established according to the conditions 0 . 0 . 0 . 1 . and thus only the chamber C10 is fed. The satellite piston 81 is brought to rest against the collar 63 and the stop 75C on element 75 is urged against the satellite piston 81, by the effect of the differential thrust between that exerted by the fluid in the chamber C10 on the piston expansion 75A and that of the spring 83.

In the arrangement of FIG. 16, the feed is established according to the conditions 1 . 1 . 0 . 1 . and thus the chambers C7, C8 and C10 are fed. The satellite piston 77 is in neutral equilibrium, the satellite piston 79 is urged by the fluid in the chamber C8 against the collar 63; the satellite piston 81 is urged by the fluid in the chamber C10 to rest against the satellite piston 79 through the extensions 79B and 81B. The stop 75C on movable element 75 is urged against the satellite piston 81 with a force which is equal to the pressure in chamber C10 applied against the section 75B and 75A, decreased by the force of the spring 83.

In the arrangement of FIG. 17 the three chambers C7, C8 and C9 are fed and the feed is established according to the conditions 1 . 1 . 1 . 0 .

The satellite pistons 77, 79 are in neutral equilibrium, while the satellite piston 81 is urged against the collar 65 forming an outer stop. The stop 75B on movable element 75 is urged by the spring 83 against the satellite piston 81.

In the arrangement of FIG. 18, the feed is established according to the conditions 1 . 1 . 1 . 1 . and all the four chambers C7 to C10 are supplied. The satellite pistons 77 and 81 are in neutral equilibrium, while the satellite piston 79 is urged against the outer stop formed by the collar 63. The thrust of the fluid in the chambers C7 and C10 on the element 75 causes the stop 75F to rest against the satellite piston 79. In the embodiment of FIGS. 8 to 18, one may also arrange the piston expansion 75A and the cylinder portion 57 having a smaller diameter than that relating to the satellite pistons, with a suitable sizing of the axial spring and of the section of the stem 75. More exactly, the area of the cross-section of the cylinder 57 will differ from the areas of the cross-sections of the cylinders 55, 53, 51 (all equal to one another) by one-half of the area of the stem of the movable element 75. The spring 83 will then be sized in such a manner as to give a force equal to about one-half of that obtained by multiplying the control pressure by the area of the bore in the cylinder 57.

In all the subsequent described positions one obtains a determined position of the movable element 75, and in particular in the sequence described in FIGS. 8 to 18 one obtains the progressive tripping advance or traverse of the element 75 towards the top in the figures of the drawing.

The satellite pistons also in this embodiment also may be made with suitable contours especially constituted by the same profiles of the extensions 77A, 79A, 79B, and 81B such as to obtain a dampening effect with the present fluid.

It is important to note that in the described embodiment wherein the cylinders are provided with only rafters with four hydraulic controls, it is not theoretically possible to obtain more than 11 positions, notwithstanding the values of a four – digit binary number are $2^4 = 16$.

As with three controls, that is with three-digit binary numbers, one obtains $2^3 = 8$ values all obtainable with satellite pistons provided with rafter-tie rods, one may take advantage in practice in using satellite pistons provided with only rafters, only when the number of the positions required is more than eight and less than 12. When the number of the controls increases, the use of satellite pistons provided with only rafters is no longer convenient, because it would involve a number of controls greater than that required in the case of satellite pistons provided with rafters and tie rods.

As in the case of three controls, the use of only the rafters allows obtaining seven positions instead of the eight positions obtainable with satellites provided with rafter-tie rod combinations, it is apparent that the use only of rafters is useful only when the number of the positions required is small.

When the number of the positions is still lower, one may restrict the use to satellites without both rafters and tie rods.

It is useless to state that the 11 positions described do not correspond to subsequent values of the four-digit binary numbers which represent the controls and which may be obtained also with different numbers of the binary code.

Instead, when it is required, with $n$ controls, to obtain all the $2^n$ possible positions, subsequent positions will be obtained by means of controls corresponding to subsequent numbers in a binary code having $n$ digits.

In the embodiment shown in FIGS. 19 to 26, there is provided an eight independent position actuator for a mechanical member (not shown), wherein there is provided a main piston, i.e., a piston expansion provided with a stem having stop members which define two intervals between which two satellite pistons may slide; also the cylinder is provided outer stops which define two gaps or intervals in which the satellite pistons may slide between outer limit-stroke stops and with an end-stroke stop at the inner end (the upper end in the drawing) for the stem; while there is additionally provided an end-stroke stop at the outer end (that is at the bottom in the drawing) for the main piston, which thus cooperates with said stop. In this embodiment, the cylinder is represented in a diagrammatical manner instead of as a sheath with connection cylinders and stop cylinders.

More particularly 101 denotes the cylinder, which has an outer stop 103 at its lower end, a length of cylinder 101A having a smaller diameter between the stop 103 and a stop 105, which joins the length 101A with a length 101B forming the interval or gap between the stop 105 and a second stop 107; a third stop 109 defines an additional interval 101C which is restricted at the top by a fourth stop 111. In the cylinder there are provided a feed at 113 at the upper end, two intermediate feeds at 115 and 117 in correspondence respectively with the interspace between the stops 109 and 107 and in correspondence with the stop 105; the orifices of feeds 113, 115, 117 indicating by an arrow the fluid feed conditions under pressure, while, when they are without the arrow, they indicate a discharge condition.

In the interior of the cylinder unit 101 described, an axially movable stem slides, provided with an outer stud 119 and a piston 121 with a suitable packing cooperating with the cylinder length 101A having a reduced cross-section with respect to the lengths 101B and 101C; the stem is extended by the lengths 123, 125, 127, 129 and is provided with a head 131; the lengths 123, 127, and the head 131 have a diameter larger than the lengths 125 and 129, and serve as inner stop members which define sliding intervals wherein respective satellite pistons 133 and 135 may slide.

The arrangement is such whereby the satellite pistons 133 and 135 may slide between the inner stop members defined by the respective intervals 125 and 129 and between the outer stops 105 and 107, and respectively 109 and 111.

Between the satellite pistons 133 and 135 there is arranged an attachment of a piston and cylinder to form a rafter configuration of maximum insertion of the piston in the cylinder, or a tie rod configuration of maximum extension of the piston from the cylinder or different intermediate positions. More exactly, the mutual attachment between the satellite pistons 133 and 135 defines a maximum spacing position as shown in the configuration of FIG. 21, wherein the attachment is shown as a tie rod 137A with the symbol of a small circle included between two segments which symbolically join the two satellite pistons; another attachment is imposed by a minimum distance, as shown in the arrangement of FIG. 24, wherein the connection is shown as a rafter 137B with the symbol of a small square included between two segments which symbolically join the two satellite pistons; all the other arrangements show an intermediate connection 137C, that is a connection wherein the two satellite pistons 133 and 135 are at a spacing which is smaller than the maximum allowable, (the arrangement of FIG. 21), and larger than the minimum allowable (the arrangement of FIG. 24).

An axial spring 139 acts on the unit 119, 123, 125, 127, 129 and 131 of the axially movable stem. The spring acts in the direction of the arrow $f_1$ in FIG. 19.

As each feed 113, 115, 117 there is possible a pressurized fluid feed or a discharge, and the control represented in a binary code with the several positions may be defined by the following table wherein the digit "0" indicates a discharge condition and the digit "1" shows a pressurized fluid feed, the three subsequent symbols being referred to the feeds 113, 115 and 117 respectively:

| | | |
|---|---|---|
| 0 | 0 | 0 |
| 0 | 0 | 1 |
| 0 | 1 | 0 |
| 0 | 1 | 1 |
| 1 | 0 | 0 |
| 1 | 0 | 1 |
| 1 | 1 | 0 |
| 1 | 1 | 1 | to which correspond the arrangements respectively of FIGS. 19 to 26. In this case, with satellite pistons provided with tie rod - rafter connection one obtains as many positions as the three-digit binary numbers, that is $2^3 = 8$. Moreover, subsequent numbers in the binary code correspond to subsequent positions of the actuator.

In the arrangement of FIG. 19, the absence of any hydraulic thrust (binary code 0 . 0 . 0) only spring 139 acts on the stem to move unit 131 to a stop against the upper end of the cylinder 101.

In FIG. 20 the only feed is in 117 (binary code 0 . 0 . 1 .) to impose the thrust of the satellite piston 133 against the stop 107 and the thrust of the piston 121 downwardly (looking at the drawing) with a force which is substantially twice that of the spring in such a manner that the stop 127 on stem unit 119 lies against the satellite piston 133.

In the arrangement of FIG. 21, the thrust of the fluid fed in 115 (binary code 0 . 1 . 0 .) urges the satellite piston 135 against the stop 111, and the satellite piston 133 downwardly (looking at the drawing), said satellite piston 133 remaining in an intermediate position in the interval 101B, said position being determined by the effect of the tie rod conditions as indicated at 137A. The spring 139 urges the stem to a stop against the satellite piston 133, the thrust of the spring being lower than and about one-half of the thrust which is exerted by the fluid on the piston 133.

In the arrangement of FIG. 22 the orifices 115 and 117 are fed (binary code 0 . 1 . 1 .). The satellite piston 133 is in neutral equilibrium condition, while the satellite piston 135 is urged against the stop 111. The piston 121 is urged downwardly in the figure, by the fluid fed in 117, and the position is defined by the abutment of the head 131 on the satellite piston 135.

In the arrangement of FIG. 23 there is effected a single feed in 113, whereby the piston 135 is urged against the stop 109. The spring 139 urges the inner unit against the satellite piston 135 and thus the position of the inner unit is defined by the shoulder formed between lengths 127 and 129 of the axial stem.

In the arrangement of FIG. 24 there are fluid feeds in 113 and in 117 (binary code 1 . 0 . 1 .). The satellite piston 135 is urged against the stop 109, while the satellite piston 133 is urged upwardly to a limit position established by the connection indicated at 137B with respect to the satellite piston 135; the arrangement of the two satellite pistons 133 and 135 is kept stable and firm by effect of the resultant of the axial thrust due to the pressure on 121, increased by the thrust on stem 129 and decreased of the spring force.

Figure 25:
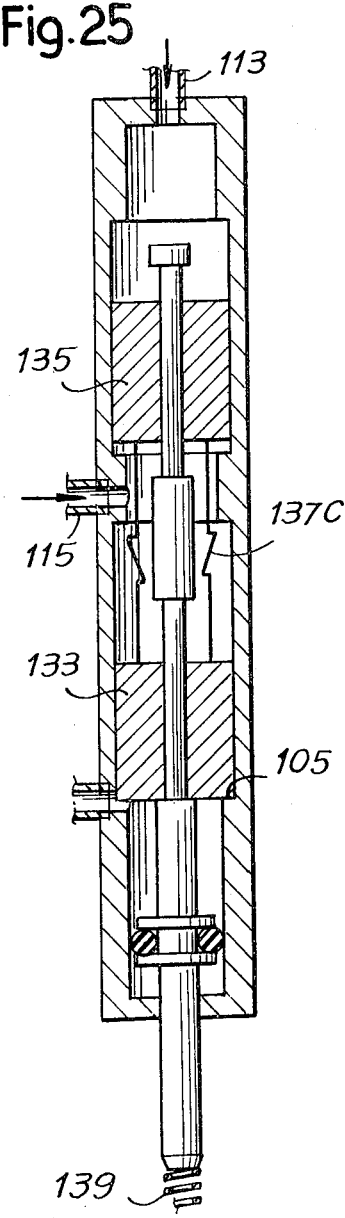

In the arrangement of FIG. 25 fluid is fed in 113 and 115 (binary code 1 . 1 . 0 .) and thus the satellite piston 135 is in neutral equilibrium, while the satellite piston 133 is urged by the fluid against the stop 105, and the force of the spring 139 decreased by the force of the pressure on the stem 129 urges the inner unit against the satellite piston 133 through the intermediary of the inner stop defined between the lengths 123 and 125 of said axial stem.

Figure 26:
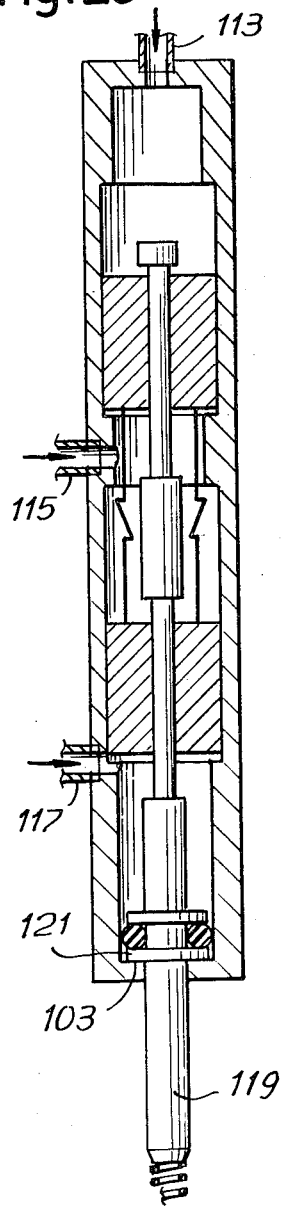

In the arrangement of FIG. 26 one obtains the maximum projection of the movable unit that is of the stem 119, by a feed in all the three orifices 113, 115, and 117 (binary code 1 . 1 . 1 .); the satellite pistons 133 and 135 are in intermediate equilibrium positions and the piston 121 is against the lower stop 103.

Under the conditions shown in the previous figures, one obtains a gradually increased projection of the stem 119, with respect to the cylinder 101. Each position may be however reached in any sequence with respect to the previous arrangements.

It is intended that the drawing illustrates embodiments given only as a practical demonstration of the invention, said embodiments being capable of modification in form and arrangements without departing from the scope of the invention.

In particular the actuator as described in the case of satellite pistons provided with rafter-tie rod may give any number of positions; and namely, if $n$ is the number of the hydraulic controls, the actuator may give $2^n$ positions without any limit for $n$. Up to $n = 3$, the positions may be all independent while, as $n$ increases, the number of the independent positions decreases, when one arrives at high numbers of positions, they should be practically all independent from one another.

What is claimed is:

1. A fluid device for the movement of a mechanical member into a plurality of positions along a rectilinear trajectory, said device comprising: a hollow cylinder including a plurality of spaced outer stops in the interior of the cylinder; an axial element axially movable in said hollow cylinder for the actuation of the mechanical member, said axial element including a stem portion, an enlarged piston on said stem portion engageable with one of said outer stops to define a maximum end position of the axial element and thus of the mechanical member, and a plurality of inner stop members axially fixed in spaced relation along said stem portion; $n$ fluid feed means axially spaced along said hollow cylinder for the feed thereinto and the discharge therefrom of fluid, $n$ being at least three; and $n-1$ satellite pistons slidably mounted on said stem portion and slidable in said hollow cylinder between two respective and adjacent of said outer stops of said cylinder and between two of said inner stop members of said stem portion such that with a feed of fluid in said feed means according to a series of combinations in binary code, there is obtained corresponding movement of the satellite pistons and of the axial element and by cooperation thereof with the stops and stop members there are defined respective stopping positions of the axial element.

2. A fluid device as claimed in claim 1, including spring means acting axially on the axial element to urge it towards to a most internal end position and having a strength greater than the thrust of the fluid on the stem portion and lower than the thrust of the fluid on the enlarged piston of said axial element.

3. A fluid device as claimed in claim 2, wherein, at least a first of said satellite pistons has an axial extension adapted to form a stop in cooperation with a second contiguous satellite piston and established therewith a stop position of said second satellite piston in an intermediate position between two outer contiguous stops, the difference of the axial forces acting in opposite directions on the assembly of the two satellite pistons under consideration, being effective to urge said first satellite piston against an outer stop of the cylinder to limit its stroke towards the second satellite piston.

4. A fluid device as claimed in claim 2, comprising means connecting two contiguous satellite pistons to limit minimum and maximum relative displacement therebetween such that when one satellite piston assumes an intermediate position between its associated contiguous outer stops, the other satellite piston is in engagement with one of its associated contiguous stops when the chamber between said two satellite pistons is fed with the pressurized fluid.

5. A fluid device as claimed in claim 1, wherein said cylinder has a constant diameter between contiguous stops, the diameter of the cylinder along which the enlarged piston of the axial element slides having a smaller diameter, the transverse dimension of the enlarged piston being smaller than that of the satellite pistons by such an extent whereby there is obtained between the active areas thereof a difference equal substantially to one-half the area of the stem portion passing through said satellite pistons.

6. A fluid device as claimed in claim 1, including profiled extensions between the satellite pistons to dampen impact therebetween.

7. A fluid device as claimed in claim 1, wherein each satellite piston is positioned to cooperate in opposite directions of displacement with two said outer contiguous stops in the cylinder and with two said inner contiguous stop members on said stem portion of the axial element; a respective feed means being arranged between two contiguous satellite pistons to communicate with a respective chamber defined between these two contiguous satellite pistons, one further said feed means being arranged between a chamber defined between said enlarged piston and the satellite piston adjacent thereto, and another further said feed means being arranged between the bottom of the hollow cylinder and the satellite piston adjacent thereto; said feed means arranged between two contiguous satellite pistons being to associated stops in the hollow cylinder.

8. A hydraulic transducer comprising a cylinder having $n$ inlets for pressurized fluid, $n$ being at least equal to 3, each inlet being either in a supply condition or a discharge condition representable by 1 and 0 in binary code system, a piston unit axially movable in the cylinder, said piston unit including a movable stem and $n-1$ satellite pistons slidably mounted on said stem, said inlets being positioned within said cylinder to apply pressure to opposite surfaces of said satellite pistons by inlet of pressurized fluid to produce movement of said satellite pistons on said stem and within said cylinder, means coupling adjacent satellite pistons to provide positions of minimum and maximum spacing therebetween, a pair of stops in said cylinder for each satellite piston to limit movement of said satellite pistons with respect to said cylinder, and a pair of stop members fixed on said stem for limiting movement of each of the satellite pistons with respect to the piston unit, said inlets being capable of being respectively in supply or discharge positions in a combination corresponding to the numbers in a binary code totaling $2^n$ and said movable stem occupying $2^n$ distinct positions corresponding to the numbers of the binary code and as determined by said satellite pistons, said stop members on the stem, said stops in said cylinder and the means coupling adjacent satellite pistons.

9. A transducer as claimed in claim 8 wherein said stem projects from said cylinder and undergoes successive movement to assume said distinct positions.

10. A transducer as claimed in claim 9 comprising a spring means axially acting on said piston unit to bias the same in the cylinder and establish selective of the $2^n$ distinct positions.

* * * * *